US012151915B2

(12) United States Patent
Sha et al.

(10) Patent No.: US 12,151,915 B2
(45) Date of Patent: Nov. 26, 2024

(54) INTERACTION TERMINAL AND SYSTEM FOR ELEVATOR

(71) Applicant: Otis Elevator Company, Farmington, CT (US)

(72) Inventors: Dan Qing Sha, Shanghai (CN); Murilo Bonilha, West Hartford, CT (US); Yi Lin Chen, Shanghai (CN); Jin Lei Ding, Shanghai (CN); Jing Long Zhang, Shanghai (CN); Ke Yang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1483 days.

(21) Appl. No.: 16/561,913

(22) Filed: Sep. 5, 2019

(65) Prior Publication Data

US 2019/0389693 A1 Dec. 26, 2019

Related U.S. Application Data

(62) Division of application No. 15/454,088, filed on Mar. 9, 2017, now Pat. No. 10,450,163.

(30) Foreign Application Priority Data

Mar. 11, 2016 (CN) ........................ 201610139488.5

(51) Int. Cl.

*B66B 1/24* (2006.01)
*B66B 1/34* (2006.01)
(Continued)

(52) U.S. Cl.

CPC ............ *B66B 1/468* (2013.01); *B66B 1/3461* (2013.01); *B66B 3/00* (2013.01); *B66B 1/2458* (2013.01);
(Continued)

(58) Field of Classification Search

CPC .......... B66B 1/2408; B66B 1/34–3423; B66B 1/3446–3461; B66B 1/468;
(Continued)

(56) References Cited

U.S. PATENT DOCUMENTS 5,445,245 A 8/1995 Ketoviita
6,108,535 A 8/2000 Moriya et al.
(Continued)

FOREIGN PATENT DOCUMENTS

CN 102303797 A 1/2012
CN 103771211 A 5/2014
(Continued)

OTHER PUBLICATIONS

Axema, "VAKA", available at: http://www.axema.se/en-GB/products/access-control-system-28354291, 2015, 2pgs.
(Continued)

*Primary Examiner* — Christopher Uhlir
(74) *Attorney, Agent, or Firm* — CANTOR COLBURN LLP

(57) ABSTRACT

An elevator interactive terminal and an elevator interactive system. The elevator interactive system of the present invention comprises an elevator interactive terminal, configured with a social communication media module, wherein a user is registered as a first registered user in the social communication media module; and a server coupled to a communication bus of an elevator system, configured with the social communication media module and to register an elevator as the second registered user in the social communication media module, wherein, based on the social communication media module, interactive communication is performed between the first registered user on the elevator interactive terminal corresponding to the user and the second registered user on the server corresponding to the elevator.

16 Claims, 5 Drawing Sheets

(51) Int. Cl.
*B66B 1/46* (2006.01)
*B66B 3/00* (2006.01)

(52) U.S. Cl.
CPC . *B66B 2201/103* (2013.01); *B66B 2201/4615* (2013.01); *B66B 2201/4653* (2013.01); *B66B 2201/4661* (2013.01)

(58) Field of Classification Search
CPC .. B66B 2201/103–21; B66B 2201/405; B66B 2201/4607; B66B 2201/4623; B66B 2201/4638–4661
See application file for complete search history.

(56) References Cited

U.S. PATENT DOCUMENTS

| | | | |
|---|---|---|---|
| 6,792,321 | B2 | 9/2004 | Sepe, Jr. |
| 7,831,675 | B2 | 11/2010 | Narayanaswami et al. |
| 7,882,939 | B2 | 2/2011 | Nakamura |
| 8,151,942 | B2 | 4/2012 | Rusanen et al. |
| 9,067,760 | B2 | 6/2015 | Bunter et al. |
| 9,485,838 | B2 | 11/2016 | Anthony et al. |
| 9,896,305 | B2 * | 2/2018 | Blandin ................ B66B 1/3461 |
| 9,957,132 | B2 | 5/2018 | Berryhill |
| 10,087,046 | B2 | 10/2018 | Armistead |
| 2002/0113877 | A1 | 8/2002 | Welch |
| 2008/0128216 | A1 | 6/2008 | Nakamura |
| 2009/0022131 | A1 | 1/2009 | Rusanen et al. |
| 2012/0048655 | A1 | 3/2012 | Hsu |
| 2012/0204233 | A1 | 8/2012 | Rubio |
| 2013/0153339 | A1 | 6/2013 | Sarjanen |
| 2013/0282454 | A1 | 10/2013 | Alpert et al. |
| 2014/0262629 | A1 | 9/2014 | Toutaoui |
| 2014/0359018 | A1 | 12/2014 | Sun |
| 2015/0127697 | A1 | 5/2015 | Marvin et al. |
| 2016/0221791 | A1 | 8/2016 | Berryhill |
| 2016/0313127 | A1 | 10/2016 | Salmikuukka |
| 2016/0325962 | A1 | 11/2016 | Blandin et al. |
| 2017/0260024 | A1 | 9/2017 | Sha et al. |
| 2018/0099840 | A1 | 4/2018 | Armistead |
| 2018/0287970 | A1 | 10/2018 | Baldi et al. |
| 2018/0290858 | A1 | 10/2018 | Barajas Gonzalez et al. |
| 2018/0290859 | A1 | 10/2018 | Barajas Gonzalez et al. |
| 2019/0034608 | A1 | 1/2019 | Trelin |
| 2019/0036865 | A1 | 1/2019 | Palola et al. |

FOREIGN PATENT DOCUMENTS

| | | | |
|---|---|---|---|
| CN | 103787158 | A | 5/2014 |
| CN | 105173930 | A | 12/2015 |
| CN | 2015819394 | U | 12/2015 |
| WO | 2014116182 | A1 | 7/2014 |
| WO | 2015135162 | A1 | 9/2015 |

OTHER PUBLICATIONS

Cockfield, Bryan, "Remote Control for an Elevator", available at: http://hackaday.com/2014/10/15/remote-control-for-an-elevator/, Oct. 15, 2014, 8pgs.
DSX Access Systems, Inc., "Building Automation and Controls", available http://www.dsxinc.com/designguide2/docs2/buildingautomation.pdf, Aug. 2011, 2pgs.
European Search Report for application EP 17160605.6, dated Jun. 26, 2017, 7 pgs.
www.facebook.com 2015 viewed online on Feb. 16, 2019.
Janakiram, "Why Facebook Might Emerge as the Biggest Internet of Things Company", Forbes, Apr. 14, 2015, 5 Pages.
Popper, "Facebook Pushes into the Internet of Things, Hoping to Help Power your Smart Devices/The Social Network wants apps Running on Parse to Work your Connected Appliances", The Verge, Mar. 25, 2015, 5 Pages.
Wolf, "Here's How Twitter Can Connect Us to the Internet of Things", Forbes, Apr. 30, 2015, 3 Pages.

* cited by examiner

INTERACTION TERMINAL AND SYSTEM FOR ELEVATOR

PRIORITY

This application is a division of U.S. patent application Ser. No. 15/454,088, filed Mar. 9, 2017, which claims priority to Chinese Patent Application No. 201610139488.5, filed Mar. 11, 2016, and all the benefits accruing therefrom under 35 U.S.C. § 119, the contents of which in its entirety are herein incorporated by reference.

TECHNICAL FIELD

The present invention falls within the technical field of elevators, and relates to an elevator interactive terminal capable of performing instant interactive communication with an elevator or an elevator group via social communication media software as well as an elevator interactive system comprising the elevator interactive terminal.

BACKGROUND ART

When an elevator is running, various users need to interact with the elevator so as to perform operations such as elevator calling. In the traditional scheme, taking a user in need of taking an elevator as an example, the interaction with the elevator is realized via an elevator calling button of the elevator of the building, thereby sending an elevator calling instruction, the user waits for the processing by an elevator dispatching system, and the elevator dispatching system assigns the corresponding elevator for the user to take. However, such scheme is very time-consuming; moreover, the interaction between the user and the elevator can only be realized via similar elevator calling buttons, and the function is very simple, for example, the user would not be able to make a reservation for the elevator in advance, the demand of the user for knowing the running state information about the elevator cannot be satisfied, etc. Taking an elevator maintenance personnel in need of maintaining or monitoring the elevator as an example, the maintenance personnel can only interact with the elevator in an elevator remote monitoring system of the elevator, which causes the interaction difficulty and requires high degree of specialization.

With the rapid development of mobile communications and artificial intelligence, the use of mobile terminals is becoming prevalent, and social communication media software, for example, WeChat, is also widely used; therefore, the communication between people becomes easier, faster and more efficient.

SUMMARY

An objective of the present invention is to achieve more efficient, easier and faster interactive communication between a user and an elevator.

Another objective of the present invention is to achieve remote instant interactive communication between a user and an elevator.

In order to achieve the above objectives or other objectives, the present invention provides the following technical solutions.

One aspect of the present invention is to provide an elevator interactive terminal, configured with a social communication media module, wherein a user is registered as a first registered user in the social communication media module, the elevator interactive terminal is configured for the user to realize, based on the social communication media module, interactive communication between the first registered user and a second registered user corresponding to one or more elevators, wherein the second registered user is correspondingly registered by the elevator in the social communication media module.

The elevator interactive terminal according to an embodiment of the present invention, wherein the social communication media module is WeChat, WhatsApp, Line, Weibo, Twitter or Facebook.

The elevator interactive terminal according to an embodiment of the present invention, wherein the elevator interactive terminal is a smart mobile terminal.

The elevator interactive terminal according to an embodiment of the present invention, wherein the elevator interactive terminal is configured for the first registered user to request to add the second registered user as a friend based on the social communication media module.

Specifically, the content subject to interactive communication between the first registered user and the second registered user is limited by a friend type of the first registered user for the second registered user.

Specifically, the first registered user is an ordinary friend of the second registered user, and the content subject to interactive communication between the first registered user and the second registered user comprises: querying of elevator running state information and corresponding first query result information returned; and/or an elevator calling instruction and corresponding elevator dispatching result information returned.

Specifically, the first registered user is a special friend of the second registered user, and the content subject to interactive communication between the first registered user and the second registered user comprises: querying of an elevator maintenance schedule and corresponding second query result information returned; an elevator control instruction; and/or elevator maintenance state information.

In one example, the first query result information comprises: a position of a floor where an elevator car is currently located, an elevator running speed and/or information about the degree of congestion of the car.

Specifically, the position of a floor where an elevator car is currently located may be acquired by the social communication media module of a server initiating a locating query.

In another example, the elevator calling instruction comprises an initial floor and a destination floor, and the corresponding elevator dispatching result information comprises a serial number of an elevator assigned, a position of a floor where the elevator assigned is currently located and a running direction.

The elevator interactive terminal according to an embodiment of the present invention, wherein the first registered user is further classified into a VIP user, a disabled user and a normal user based on a user identity, wherein the VIP user and the disabled user have a higher priority, with respect to the normal user, to perform interactive communication with the second registered user.

The elevator interactive terminal according to an embodiment of the present invention, wherein the content subject to interactive communication between the first registered user and the second registered user comprises text information, voice information and/or image information.

Specifically, the image information sent by the second registered user comes from an image sensor in a corresponding elevator car.

The elevator interactive terminal according to an embodiment of the present invention, wherein the second registered user publishes information via the social communication media module, and the first registered user of the elevator interactive terminal acquires the published information via the social communication media module.

The elevator interactive terminal according to an embodiment of the present invention, wherein the second registered user of the elevator is correspondingly registered by an elevator group, which is composed of multiple elevators, in the social communication media module.

The elevator interactive terminal according to an embodiment of the present invention, wherein the first registered user and the second registered user further perform interactive communication via cloud, and the content subject to interactive communication between the first registered user and the second registered user is stored in a cloud server of the cloud.

Another aspect of the present invention is to provide an elevator interactive system, comprising: an elevator interactive terminal, configured with a social communication media module, wherein a user is registered as a first registered user in the social communication media module; and a server coupled to a communication bus of an elevator system, configured with the social communication media module and to register an elevator as the second registered user in the social communication media module; wherein, based on the social communication media module, interactive communication is performed between the first registered user on the elevator interactive terminal corresponding to the user and the second registered user on the server corresponding to the elevator.

The elevator interactive system according to an embodiment of the present invention, wherein the social communication media module is WeChat, WhatsApp, Line, Weibo, Twitter or Facebook.

The elevator interactive system according to an embodiment of the present invention, wherein the server is coupled to an elevator bus.

The elevator interactive system according to an embodiment of the present invention, wherein the server is provided with: a first transcoding module, used for converting information during the transmission by the first registered user into information that complies with an elevator bus data format, and a second transcoding module, used for converting information during the transmission by the elevator bus into information with a format that is readable to the social communication media module.

The elevator interactive system according to an embodiment of the present invention, wherein the server is provided with a voice assistant module.

The elevator interactive system according to an embodiment of the present invention, wherein the elevator interactive terminal and the server are in a communication connection via a 3G/4G network, and accordingly the server is provided with a 3G/4G transceiver.

The elevator interactive system according to an embodiment of the present invention, wherein the first registered user and the second registered user further perform interactive communication via cloud, and the content subject to interactive communication between the first registered user and the second registered user is stored in a cloud server of the cloud.

The elevator interactive system according to an embodiment of the present invention, wherein the server is coupled to an image sensor provided in a car of the elevator, wherein the server is configured to send, according to a command request of the first registered user of the elevator interactive terminal, image information collected by the image sensor at a corresponding time to the first registered user.

Specifically, the server is coupled to a building manage system of a building, the content subject to interactive communication between the first registered user and the second registered user is sent, all or in part, to the building manage system, and the building manage system is configured to adjust and control, according to the content subject to interactive communication between the first registered user and the second registered user, the state of other devices or systems except the elevator.

Specifically, the elevator interactive terminal is a smart mobile terminal.

The elevator interactive system according to an embodiment of the present invention, wherein the elevator interactive terminal is configured for the first registered user to request to add the second registered user as a friend based on the social communication media module.

Specifically, the content subject to interactive communication between the first registered user and the second registered user is limited by a friend type of the first registered user for the second registered user.

Specifically, the first registered user is an ordinary friend of the second registered user, and the content subject to interactive communication between the first registered user and the second registered user comprises: querying of elevator running state information and corresponding first query result information returned; and/or an elevator calling instruction and corresponding elevator dispatching result information returned.

Specifically, the first registered user is a special friend of the second registered user, and the content subject to interactive communication between the first registered user and the second registered user comprises: querying of an elevator maintenance schedule and corresponding second query result information returned; an elevator control instruction; and/or elevator maintenance state information.

Specifically, the first query result information comprises: a position of a floor where an elevator car is currently located, an elevator running speed and/or information about the degree of congestion of the car.

Specifically, the position of a floor where an elevator car is currently located may be acquired by the social communication media module of the server initiating a locating query.

Specifically, the elevator calling instruction comprises an initial floor and a destination floor, and the corresponding elevator dispatching result information comprises a serial number of an elevator assigned, a position of a floor where the elevator assigned is currently located and a running direction.

The elevator interactive system according to an embodiment of the present invention, wherein the first registered user is further classified into a VIP user, a disabled user and a normal user based on a user identity, wherein the VIP user and the disabled user have a higher priority, with respect to the normal user, to perform interactive communication with the second registered user.

The elevator interactive system according to an embodiment of the present invention, wherein the second registered user publishes information via the social communication media module, and the first registered user of the elevator interactive terminal acquires the published information via the social communication media module.

The technical effects of the present invention are that the elevator interactive terminal and the elevator interactive system according to the embodiments of the present invention can be achieved based on the large-scale application of instant on-line chatting tools, which not only eliminates the specific development of corresponding APPs or software, resulting in a low development cost, but also makes it easier for a user to accept such interactive communication mode with the elevator; moreover, the interactive communication process can be achieved by means of instant on-line chatting, and the interactive communication process with the elevator is very convenient, simple, efficient, easy and fast, and can be achieved remotely. Therefore, the user experience is greatly improved.

BRIEF DESCRIPTION OF THE ACCOMPANYING DRAWINGS

The following detailed description in conjunction with the accompanying drawings explains the above and other objectives and advantages of the present invention more completely and clearly, wherein the same or similar elements are denoted by the same reference numerals.

DETAILED DESCRIPTION

Some of multiple possible embodiments of the present invention are introduced below, and intended to provide basic understanding of the present invention but not to determine the key or decisive elements of the present invention or define the scope of protection. It should be easily understood that, according to the technical solution of the present invention, a person of ordinary skill in the art would have bring about other alternative implementations without changing the essential spirit of the present invention. Therefore, the following detailed description and accompanying drawings are merely to illustratively describe the technical solutions of the present invention, and should not be considered as the entirety of the present invention or considered as defining or limiting the technical solutions of the present invention.

In the following description, in order to make the description clear and concise, not all the multiple components or modules shown in the accompanying drawings are described in detail. Multiple components or modules that can achieve the present invention in the opinion of a person of ordinary skill in the art are shown in the accompanying drawings, and for a person skilled in the art, the operation of many components or modules is familiar and obvious.

Figure 1:
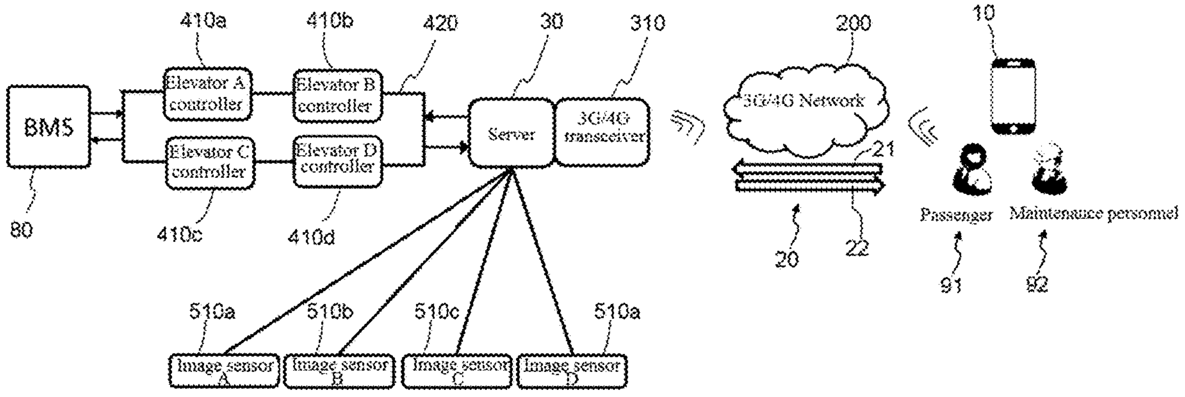
FIG. 1 is a schematic structural view of modules of an elevator interactive system according to an embodiment of the present invention.

FIG. 1 is a schematic structural view of modules of an elevator interactive system according to an embodiment of the present invention. As shown in FIG. 1, the elevator interactive system according to the embodiments of the present invention adopts an elevator interactive terminal 10 according to an embodiment, wherein the elevator interactive terminal 10 can be various smart mobile terminals used by a user, for example, a smart phone shown in FIG. 1; the elevator interactive terminal 10 is carried around by the user and is convenient to use; and the elevator interactive terminal 10 is installed with various social communication media applications or social communication media software, for example, WeChat, WhatsApp, Line, Weibo, Twitter or Facebook.

Corresponding to an elevator control end, the elevator interactive terminal is also correspondingly configured with a server 30, wherein the server 30 can be a computer module and can be used together with a server of an elevator control system; and the server 30 is likewise installed with corresponding social communication media applications or social communication media software, for example, WeChat, WhatsApp, Line, Weibo, Twitter or Facebook.

The social communication media applications installed in the elevator interactive terminal 10 and the server 30 are of the same type, for example, both are Wechat. Generally, social communication media applications are used by a wide range of users and are widely used; therefore, a communication interaction mode with an elevator based on such social communication media applications will be easily accepted. Moreover, the social communication media applications are powerful, for example, they can achieve interactive transmission of various forms of information, such as text, image and voice, between different users, and for example, they also have the we-media release function, and thus are very favorable to expanding forms of content subject to interactive communication between a user and an elevator.

It should be noted that the specific types of social communication media applications or software are not the embodiments of the present application, for example, they can be various different types of social communication media applications or software that appear after the filing date of the present application. The following illustrative description is provided by taking the social communication media application being Wechat as an example, wherein the server 30 and the elevator interactive terminal 10 download a Wechat client program and install the program; therefore, there is no need to specifically develop an APP or software suitable for an elevator interactive terminal with regard to the interaction with an elevator. It should be understood that other social communication media applications can also achieve the purpose and function of the present application based on a similar principle.

With regard to a user, the user is registered as a first registered user in Wechat of the elevator interactive terminal 10, and different users are registered as different first registered users. Since users are already registered as the first registered users (i.e. having a user ID) when using Wechat for social chatting, there is no need to specifically register a corresponding user ID with regard to the interactive communication with an elevator.

With regard to one or more elevators, the one or more elevators are registered as second registered users at the server 30 end, and the second registered users can actively send, via the server 30, information to the corresponding first registered user. In the embodiment, multiple elevators can be taken as a group and registered as a second registered user (i.e. user ID), and taking elevator A, elevator B, elevator C and elevator D in a building constituting an elevator group as an example, the elevator group registers a registered user ID, i.e. the second registered user, in Wechat via the server 30. It should be noted that each elevator can also be registered as a second registered user, and if there are multiple elevator groups in a building, each elevator group registers a corresponding user ID.

Taking the elevator interactive terminal 10 being a smart phone installed with Wechat as an example, the server 30 and the elevator interactive terminal 10 are in a communication connection via a network 200, wherein the network 200 can be specifically but is not limited to a 3G/4G network, the server 30 end is provided with a corresponding 3G/4G transceiver 310, and accordingly, Wechat information sent by the user via the elevator interactive terminal 10 can be instantly received by the 3G/4G transceiver 310 and transferred to the server 30. It should be noted that, in the network 200, the interaction of transmission content can be performed via a server of a social communication media application operator (for example, a Wechat operator); the network 200 is also not limited to the 3G/4G network, and can also be, for example, a 5G network or wireless network; and in the embodiment shown in the figure of the present invention, the illustrative description is provided based on the 3G/4G network.

In one embodiment, the server 30 is coupled to an elevator bus 420, thereby realizing the coupling to a controller 410 of several elevators. Taking an elevator group constituted by elevator A, elevator B, elevator C and elevator D as an example, their corresponding elevator A controller 410*a*, elevator B controller 410*b*, elevator C controller 410*c* and elevator D controller 410*d* are all arranged on the elevator bus 420. Therefore, the server 30 can perform interactive communication with each of the elevator controllers.

Figure 2:
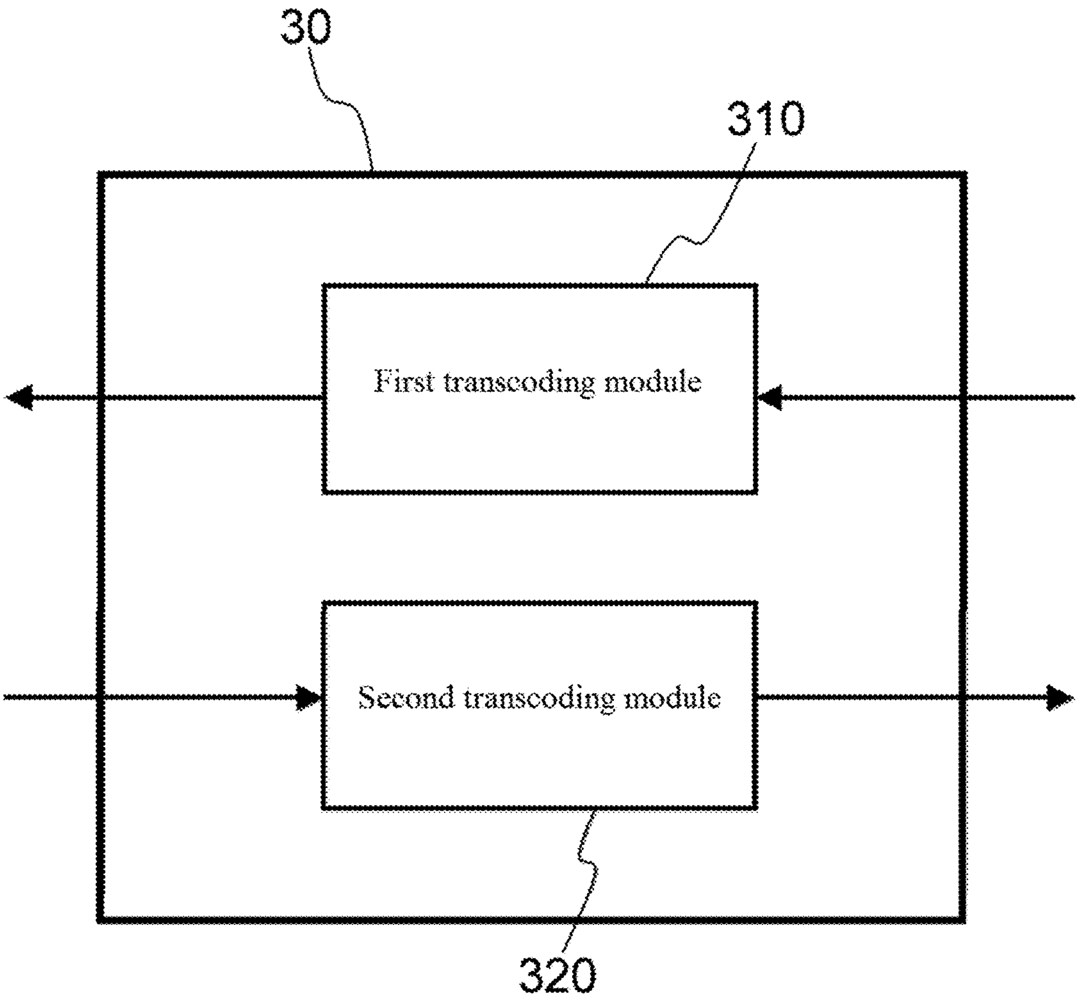
FIG. 2 is a schematic structural view of modules of a server of the elevator interactive system in the embodiment shown in FIG. 1.

FIG. 2 is a schematic structural view of modules of a server of the elevator interactive system in the embodiment shown in FIG. 1. In the embodiment, the server 30 is provided with two transcoding modules, i.e. a first transcoding module 310 and a second transcoding module 320, wherein the first transcoding module 310 can receive a user message or a user instruction sent from the 3G/4G transceiver 310, the user message or the user instruction being, for example, in a Wechat voice format, and the first transcoding module 310 converts the same into a message or an instruction that complies with an elevator bus data format and up-sends the same to the elevator bus 420, thereby being capable of performing interactive communication with each of the elevator controllers. The second transcoding module 320 can receive a message or information transmitted from the elevator bus 420, converts the same into a message or information that complies with a social communication media application format, for example, converting the same into Wechat voice, and sends the same to the 3G/4G transceiver 310 and further transmits the same to a user of the elevator interactive terminal 10.

In this way, the interactive communication between a user and an elevator or an elevator group can be achieved, and can be achieved by means of on-line chatting.

Before the interactive communication between a user and an elevator or an elevator group, a first registered user corresponding to the user of the elevator interactive terminal 10 needs to firstly request to add a second registered user corresponding to the elevator or the elevator group as a friend, and to be authenticated by a staff managing the second registered user. The above process of adding a friend can be performed in Wechat, and the staff managing the second registered user can determine whether the first registered user passes the authentication depending on building management rules, first registered user information, etc., the specific condition of which is not limited.

Continued as shown in FIG. 1, in the embodiment, two types of users are shown, i.e. a passenger 91 and a maintenance personnel 92, wherein the passenger 91 needs to implement an elevator calling function of the elevator, while the maintenance personnel 92 has more demands with respect to the passenger 91, for example, demand for more elevator-related information. It should be understood that the user is not limited to the two types in the embodiments of the present invention, for example, users who are building management staff can also be added.

In the embodiment, a first registered user corresponding to a user like the passenger 91 is defined as an ordinary friend of the second registered user corresponding to the elevator or the elevator group, and a first registered user corresponding to a user like the maintenance personnel 92 is defined as a special friend of the second registered user corresponding to the elevator or the elevator group. Different friend types determine the width and depth of content subject to interactive communication between the user and the elevator or the elevator group, that is, the content subject to interactive communication between the first registered user and the second registered user is limited by a friend type of the first registered user for the second registered user. When the first registered user is an ordinary friend of the second registered user, the content subject to interactive communication between the first registered user and the second registered user (i.e. between the passenger 91 and the elevator or the elevator group) comprises but is not limited to: querying of elevator running state information and corresponding first query result information returned; and/or an elevator calling instruction and corresponding elevator dispatching result information returned. When the first registered user is a special friend of the second registered user, the content subject to interactive communication between the first registered user and the second registered user (i.e. between the maintenance personnel 92 and the elevator or the elevator group) comprises but is not limited to: querying of elevator running state information and corresponding first query result information returned; an elevator calling instruction and corresponding elevator dispatching result information returned, and further comprises querying of an elevator maintenance schedule and corresponding first query result information returned; an elevator control instruction; and/or elevator maintenance state information.

When the second registered user acquires the first query result information like the position of the elevator, the position of the elevator can be queried based on a locating function of Wechat, which is convenient and fast.

In an embodiment, the passenger 91 or the maintenance personnel 91 can query elevator running state information about the corresponding elevator or elevator group before sending an elevator calling instruction, for example, querying elevator running state information such as a floor where an elevator car is currently located, querying an elevator running speed and/or querying information about the degree of congestion of the car. It should be noted that the elevator running state information queried by any passenger 91 or maintenance personnel 91 is not limited to the above embodiment, and any elevator running state information that is favorable to improving passenger experience but does not affect normal operation of the elevator can be queried actively by the passenger 91 or the maintenance personnel 92, and thus can be learned by the user.

The second registered user corresponding to the elevator or the elevator group can feed back corresponding query result information, i.e. the first query result information, according to the active query by the passenger 91 or the maintenance personnel 92. The first query result information comprises but is not limited to: a position of a floor where an elevator car is currently located, an elevator running speed and/or information about the degree of congestion of the car. Accordingly, the passenger 91 can determine or adjust the elevator calling instruction according to the result information.

The elevator calling instruction sent by the passenger 91 or the maintenance personnel 91 in the elevator interactive terminal 10 can specifically be an elevator calling instruction comprising an initial floor and destination floor information. Of course, in other embodiments, the elevator calling instruction can also be a "going-up" or "going-down" elevator calling instruction (not comprising the destination floor information), or an elevator calling reservation instruction comprising initial floor and destination floor information and a reservation time. Therefore, the user can call an elevator in various forms, and the user experience is good. These elevator calling instructions are up-sent to the elevator bus 420 via the 3G/4G network 200, the 3G/4G transceiver 310 and the server 30 in sequence, and thus can be up-sent to a dispatching control system (not shown in the figure) of the elevator system; the dispatching control system feeds dispatching control information back to the corresponding elevator controller 410; the elevator controller 410 further sends elevator dispatching result information to the server 30; and the second transcoding module 320 of the server 30 performs format conversion and then feeds the same back in Wechat voice to the first registered user, i.e. the passenger 91 or the maintenance personnel 92. Specifically, the corresponding elevator dispatching result information may comprise but is not limited to: a serial number of an elevator assigned, a position of a floor where the elevator assigned is currently located and a running direction. In this way, the user could expect the waiting time, etc., which is favorable to improving user experience.

When the first registered user uses the elevator calling reservation instruction to make a reservation for the elevator, the second registered user does not return the corresponding elevator dispatching result information instantly, but feeds the corresponding elevator dispatching result information back to the first registered user when the reservation time point is coming. Based on the elevator interactive terminal 10 according to the embodiments of the present invention, the reservation of elevator calling can be easily achieved, which not only facilitates the improvement of background dispatching algorithm and efficiency of the elevator system, but also more efficiently dispatches an elevator at a reservation time, thereby shortening the passenger's waiting time and improving the running efficiency of the elevator.

In the embodiment, the maintenance personnel can implement interactive communication of more information contents with the elevator, and can, as stated above, even send the elevator control instruction to the elevator system, for example, sending an elevator control instruction that enables the elevator to enter a sleep mode at a reservation time. The second registered user corresponding to the elevator can even actively send the elevator maintenance state information to the first registered user corresponding to the maintenance personnel, for example, actively sending elevator maintenance state information such as "lubricating oil remaining condition" to the maintenance personnel, so as to actively provide an alarm or embodiment to the maintenance personnel, which is beneficial for the maintenance personnel to rapidly conduct the maintenance work and ensures safe running of the elevator. It should be noted that the elevator maintenance state information can refer to state information about components or modules of the elevator that need to be maintained, and can be chosen and determined according to the components or modules that need to be maintained.

Furthermore, the maintenance personnel 92 queries an elevator maintenance schedule; the query is up-sent to the elevator bus 420 by the server 30, and second query result information is returned after the elevator maintenance schedule is queried in the elevator system; and the second query result information is returned to the first registered user corresponding to the maintenance personnel 92 after being transcoded by the server 30; accordingly, the maintenance work plan or maintenance work arrangement can be easily learned.

The above interactive communication between the first registered user of the elevator interactive terminal 10 and the second registered user of the server 30 is shown by a numeral 20 as shown in FIG. 1, wherein 21 represents information sent from the first registered user of the elevator interactive terminal 10, and 22 represents information sent or returned from the second registered user (the server 30 end) corresponding to the elevator or the elevator group. Based on Wechat, the instant chatting between the first registered user of the elevator interactive terminal 10 and the second registered user corresponding to the elevator or the elevator group is achieved, and operations such as elevator calling is implemented conveniently and quickly; moreover, the interactive communication between the user and the elevator can be achieved via, for example, the 3G/4G network 200, and is not limited by the local position, and remote instant interactive communication can be achieved. Therefore, the user experience is greatly improved, with a high user acceptability.

In yet another embodiment, the first registered user can be classified into three types, i.e. a VIP user, a disabled user and a normal user, according to the priority of interactive communication. The three types, i.e. a VIP user, a disabled user and a normal user, can be but are not limited to the above ordinary friend type. When the user requests to add a friend, the first registered user is further defined as a certain type of user according to the identity authentication of the first registered user. The first registered users corresponding to the VIP user and the disabled user have a relatively higher permission to perform interactive communication with the second registered user, and the second registered user preferentially receives instructions such as elevator calling sent by the VIP user and the disabled user, and preferentially processes the same. For example, in case of urgent evacuation, the second registered user only receives or preferentially receives the elevator calling instruction sent by the disabled user. In the server 30, the classification of different users can be achieved simply by the second registered user managing and classifying the first registered users in a friend list.

Continued as shown in FIG. 1, in the embodiment, the server 30 can be further coupled to an image sensor A510*a*, an image sensor B510*b*, an image sensor C510*c* and an image sensor D510*c* respectively corresponding to the elevator A, the elevator B, the elevator C and the elevator D; the image sensor A, the image sensor B, the image sensor C and the image sensor D each can be, for example, an image sensor installed inside the car of the elevator A, the elevator B, the elevator C and the elevator D, and image information obtained thereby can be up-sent to the server 30; the server 30 can send image information of a corresponding time to the first registered user according to a command request of the first registered user of the elevator interactive terminal 10, wherein the image information can reflect information about the degree of congestion of the car, etc. and can be used for reference by the first registered user, for example, for reference to learn about the current degree of congestion of the car. Of course, the first registered user can directly initiate video interactive communication, for example, video chatting, with the second registered user, and in this way, it is convenient for the passenger 91 or the maintenance personnel 92 to learn information or state inside the car more comprehensively.

In yet another embodiment, when the first registered user queries and learns about the current degree of congestion of the elevator car, information about the degree of congestion can also be obtained by calculation in the server 30 (for example, according to the percentage of load weight to the full load); the second registered user replies, via the server 30, the information about the degree of congestion such as "congested" and "full-loaded" to the first registered user; and the passenger can conveniently and easily learn the information about the degree of congestion.

Therefore, the content subject to interactive communication 20 between the first registered user of the elevator interactive terminal 10 and the second registered user of the server 30 not only comprises text information (for example, text information represented by Wechat voice), can also comprise image information (for example, one or more pieces of picture information or video information) from the image sensor A510*a*, the image sensor B510*b*, the image sensor C510*c* and the image sensor D510*c* above, and can even comprise voice information. Taking Wechat as an example, the first registered user or the second registered user can send voice information, or the two can realize voice chatting. In this regard, a voice assistant module (not shown in the figure), for example, Siri voice assistant or Cotena voice assistant, can be provided in the server 30. With the voice assistant module, the second registered user can not only recognize voice information or voice instructions sent by the first registered user, and can even convert information fed back by the elevator controller into voice information and send the same to the first registered user.

Continued as shown in FIG. 1, in an embodiment, the server 30 can be directly or indirectly coupled to a Building Manage system (BMS) 80 of a building, for example, as shown in FIG. 1, coupled to the BMS80 via the elevator bus 420, so that the server 30 can further perform interactive communication with the BMS80. For example, the content returned by the elevator controller 410 to the server 30 can be transmitted simultaneously, all or in part, to the BMS80, and the server 30 can send simultaneously information or instructions received from the first registered user to the BMS80 after format conversion. That is to say, the content subject to interactive communication between the first registered user and the second registered user can be sent, all or in part, to the BMS80, and the BMS80 is further configured to adjust and control, according to the content subject to interactive communication between the first registered user and the second registered user, the state of other devices or systems (except the elevator) controlled thereby. For example, the BMS80 can learn about the elevator calling instruction of the user and the current running state of the elevator according to the content subject to interactive communication between the first registered user and the second registered user, and in this way, the BMS80 can determine that there is a user who is currently going to attend a meeting in a conference room at a certain floor; the BMS80 then controls the air-conditioning system, the light control system, etc. and automatically turns on the air conditioner and the light of the conference room at that floor in time, and even sets the light and the air conditioner to a predetermined mode, or the BMS80 can further control the door control system, and recognize and automatically unlock the door control system when the user arrives. The following example provides an application embodiment of the elevator interactive system.

Figure 3:
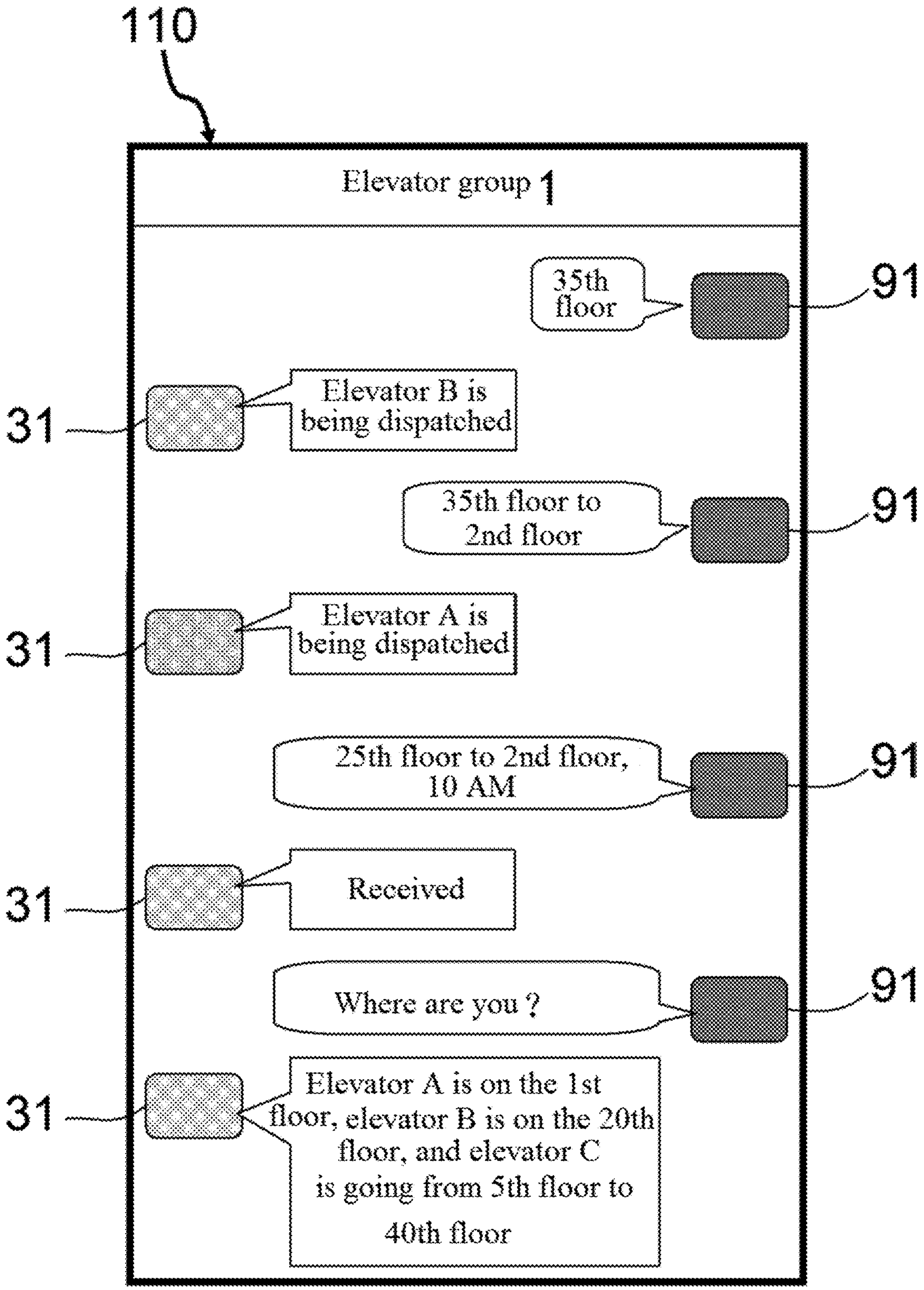
FIG. 3 is an application example of an elevator interactive terminal performing interactive communication with an elevator according to an embodiment of the present invention.

FIG. 3 shows an application example of an elevator interactive terminal performing interactive communication with an elevator according to an embodiment of the present invention. As shown in FIG. 3, a Wechat session window 110 of the elevator interactive terminal 10 shows the scenario of Wechat chatting between the first registered user 91 corresponding to the passenger and a second registered user 31 corresponding to an elevator group 1 (comprising the elevator A, the elevator B, the elevator C and the elevator D). In the example, the first registered user 91 sends an elevator calling instruction (for example, "35th floor" and "35th floor to 2nd floor") or an elevator calling reservation instruction (for example, "25th floor to 2nd floor, 10 AM"), and the second registered user 31 instantly returns the corresponding elevator dispatching result information (for example, "elevator B is being dispatched", "elevator A is being dispatched" and "received"); and the first registered user 91 queries the elevator running state information (for example, "where are you"), and the second registered user 31 instantly returns the corresponding first query result information (for example, "elevator A is on the 1st floor, elevator B is on the 20th floor, and elevator C is going from 5th floor to 40th floor"), with the result information mainly being a position of a floor where an elevator car is currently located.

Figure 4:
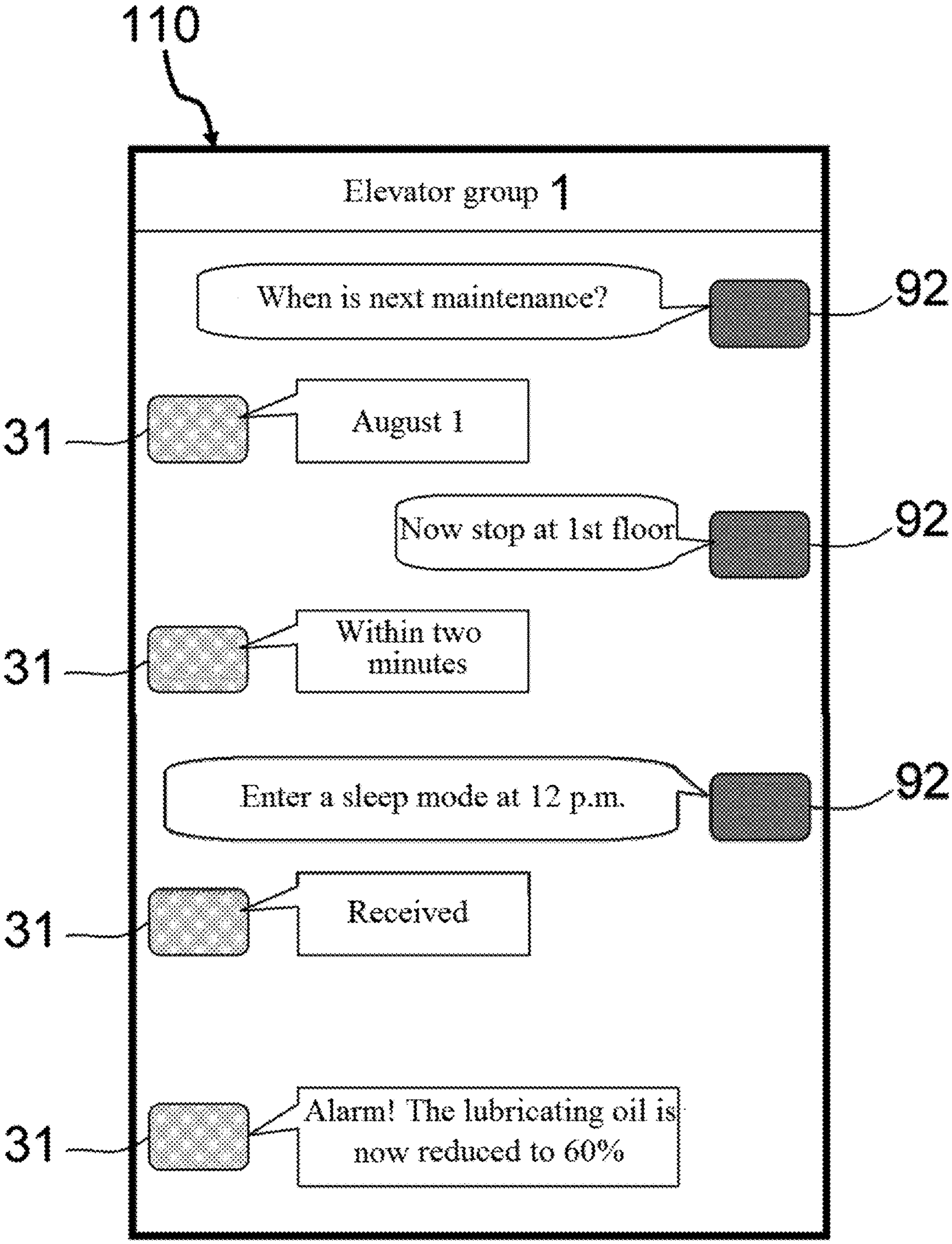
FIG. 4 is another application example of an elevator interactive terminal performing interactive communication with an elevator according to an embodiment of the present invention.

FIG. 4 shows another application example of an elevator interactive terminal performing interactive communication with an elevator according to an embodiment of the present invention. As shown in FIG. 4, a Wechat session window 110 of the elevator interactive terminal 10 shows the scenario of an instant on-line session between the first registered user 92 corresponding to the maintenance personnel and the second registered user 31 corresponding to the elevator group 1 (comprising the elevator A, the elevator B, the elevator C and the elevator D). In the example, the first registered user 92 sends an instruction of querying an elevator maintenance schedule (for example, "when is next maintenance?"), and the second registered user 31 instantly returns the corresponding second query result information (for example, "August 1"); the first registered user 92 sends an elevator control instruction (for example, "now stop at 1st floor" and "enter a sleep mode at 12 p.m."), and the second registered user 31 returns the corresponding response (for example, "within two minutes" and "received"); and the second registered user 31 can further actively send the elevator maintenance state information (for example, "Alarm! The lubricating oil is now reduced to 60%") at a certain time, so that the elevator maintenance personnel can instantly receive the information on-line and rapidly start the maintenance of the elevator.

It should be noted that the content subject to and the mode of interactive communication between the elevator interactive terminal and the elevator are not limited to the above embodiment, for example, the second registered user can publish information (for example, publishing information about the elevator being currently in a maintenance state) on his/her Wechat moments, so that multiple first registered users can conveniently learn about the information. Therefore, the elevator can implement interactive communication with the user by means of social media.

Figure 5:
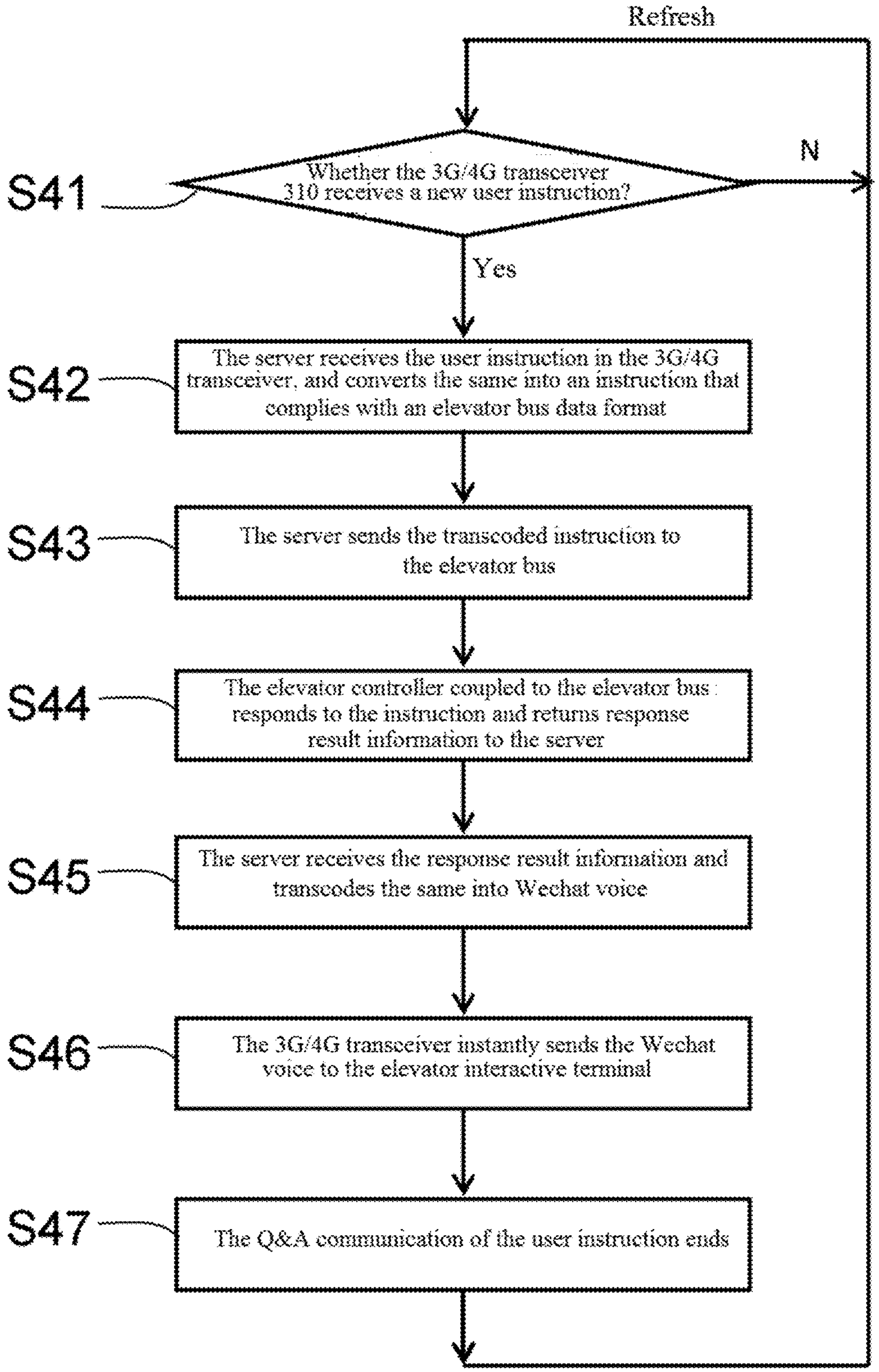
FIG. 5 is a schematic diagram of a process of an elevator interactive terminal performing interactive communication with an elevator according to an embodiment of the present invention.

FIG. 5 shows a schematic diagram of a process of an elevator interactive terminal performing interactive communication with an elevator according to an embodiment of the present invention. The following detailed description is given with reference to FIGS. 1, 2 and 5, wherein the interactive communication process between the corresponding server 30 end and the elevator controller is mainly shown, and a Q&A communication process of a user instruction is used for illustrative description.

Firstly, in step S41, it is determined whether the 3G/4G transceiver 310 receives a new user instruction. The user instruction can be various instructions or information in a Wechat voice format sent from the elevator interactive terminal 10 by the first registered user corresponding to the passenger 91 or the maintenance personnel 92.

Furthermore, in step S42, the server 30 receives the user instruction in the 3G/4G transceiver 310, and converts the same into an instruction that complies with a data format of the elevator bus 420. This step is mainly implemented by the first transcoding module 310 of the server 310 shown in FIG. 2.

Furthermore, in step S43, the server 30 sends the transcoded instruction to the elevator bus 420.

Furthermore, in step S44, the elevator controller 410 coupled to the elevator bus 420 responds to the instruction and returns response result information to the server 30. For example, when the instruction is querying the position of the elevator, the elevator controller 410 responds to the instruction and feeds back the position of each elevator in the elevator group. It should be understood that, in other embodiments, other components or systems (elevator dispatching systems, etc.) coupled to the elevator bus 420 can also respond to the corresponding instruction and return response result information to the server 30.

Furthermore, in step S45, the server receives the response result information and transcodes the same into Wechat voice. This step is mainly implemented by the second transcoding module 320 of the server 310 shown in FIG. 2.

Furthermore, in step S46, the 3G/4G transceiver instantly sends the Wechat voice to the elevator interactive terminal, i.e. to the first registered user.

Up to now, in step S47, the Q&A communication of the user instruction ends.

The above steps S41 to step S47 can be performed cyclically.

Figure 6:
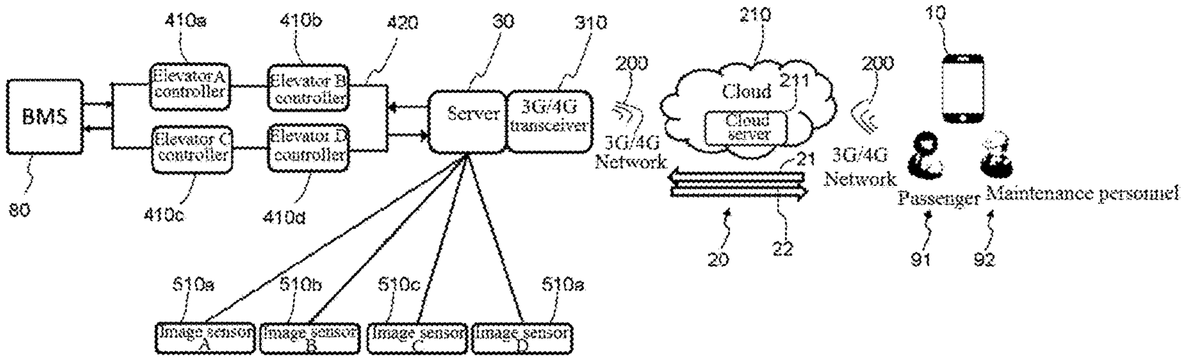
FIG. 6 is a schematic structural view of modules of an elevator interactive system according to another embodiment of the present invention.

FIG. 6 shows a schematic structural view of modules of an elevator interactive system according to another embodiment of the present invention. Compared with the elevator interactive system according to the embodiment shown in FIG. 1, the main difference of the elevator interactive system according to the embodiment shown in FIG. 6 is that the network 200 is provided with cloud 210. The same or similar components as those according to the embodiment shown in FIG. 1 will not be described herein again.

As shown in FIG. 6, the server 30 can be in a communication connection with the cloud 210 via the network 200 and perform data transmission, and the elevator interactive terminal 10 can also be in a communication connection with the cloud 210 via the network 200 and perform data transmission; the cloud 210 is provided with one or more cloud servers 211, and the content subject to interactive communication between the first registered user and the second registered user can all be stored in the cloud server 211 in the form of cloud data, and mutual interactive communication can be performed based on the cloud. In this way, elevator systems in pursuit of information security are relatively safe. Specifically, the cloud server 211 can set a corresponding cloud database to store the content subject to interactive communication between the first registered user and the second registered user.

The elevator interactive terminal and the elevator interactive system according to the embodiments of the present invention can be achieved based on the large-scale application of instant on-line chatting tools, which not only eliminates the specific development of corresponding APPs or software, resulting in a low development cost, but also makes it easier for a user to accept such interactive communication mode with the elevator; moreover, the interactive communication process can be achieved by means of instant on-line chatting, and the interactive communication process with the elevator is very convenient, simple, efficient, easy and fast, and can be achieved remotely. Therefore, the user experience is greatly improved.

It is to be understood that when it is said that a component is "connected" or "coupled" to another component, the component can be directly connected or coupled to the another component, or there may be an intermediate component. On the contrary, when it is said that a component is "directly coupled" or "directly connected" to another component, there is no intermediate component.

The above examples mainly describe the elevator interactive terminal and the elevator interactive system of the present invention. Although only some implementations of the present invention are described, a person of ordinary skill in the art should understand that the present invention can be implemented in many other forms without departing from the spirit and scope of the invention. Therefore, the examples and implementations shown are considered as illustrative and not restrictive, and the present invention might cover various modifications and replacements without departing from the spirit and scope of the present invention defined by the attached claims.

What is claimed is:

1. An elevator interactive system, comprising:

an elevator interactive terminal, configured with a social communication media module, wherein a user is registered as a first registered user in the social communication media module; and a server coupled to a communication bus of an elevator system, configured with the social communication media module and to register an elevator as a second registered user in the social communication media module, the server coupled to an elevator bus;

wherein, based on the social communication media module, interactive communication is performed between the first registered user on the elevator interactive terminal corresponding to the user and the second registered user on the server corresponding to the elevator;

wherein the server comprises:

a first transcoding module, used for converting information during the transmission by the first registered user into information that complies with an elevator bus data format, and a second transcoding module, used for converting information during the transmission by the elevator bus into information with a format that is readable to the social communication media module.

2. The elevator interactive system according to claim 1, characterized in that the social communication media module is WeChat, WhatsApp, Line, Weibo, Twitter or Facebook.

3. The elevator interactive system according to claim 1, characterized in that the server is provided with a voice assistant module.

4. The elevator interactive system according to claim 1, characterized in that the elevator interactive terminal and the server are in a communication connection via a 3G/4G network, and accordingly the server is provided with a 3G/4G transceiver.

5. The elevator interactive system according to claim 1, characterized in that the first registered user and the second registered user further perform interactive communication via cloud, and content subject to interactive communication between the first registered user and the second registered user is stored in a cloud server of the cloud.

6. The elevator interactive system according to claim 1, characterized in that the server is coupled to an image sensor provided in a car of the elevator, wherein the server is configured to send, according to a command request of the first registered user of the elevator interactive terminal, image information collected by the image sensor at a corresponding time to the first registered user.

7. The elevator interactive system according to claim 1, characterized in that the server is coupled to a building manage system of a building, the content subject to interactive communication between the first registered user and the second registered user is sent, all or in part, to the building manage system, and the building manage system is configured to adjust and control, according to the content subject to interactive communication between the first registered user and the second registered user, a state of other devices or systems except the elevator.

8. The elevator interactive system according to claim 1, characterized in that the elevator interactive terminal is a smart mobile terminal.

9. The elevator interactive system according to claim 1, characterized in that the elevator interactive terminal is configured for the first registered user to request to add the second registered user as a friend based on the social communication media module.

10. The elevator interactive system according to claim 9, characterized in that content subject to interactive communication between the first registered user and the second registered user is limited by a friend type of the first registered user for the second registered user.

11. The elevator interactive system according to claim 10, characterized in that the first registered user is an ordinary friend of the second registered user, and the content subject to interactive communication between the first registered user and the second registered user comprises:

querying of elevator running state information and corresponding first query result information returned; and/or an elevator calling instruction and corresponding elevator dispatching result information returned.

12. The elevator interactive system according to claim 10, characterized in that the first registered user is a special friend of the second registered user, and the content subject to interactive communication between the first registered user and the second registered user comprises:

querying of an elevator maintenance schedule and corresponding second query result information returned;

an elevator control instruction; and/or elevator maintenance state information.

13. The elevator interactive system according to claim 11, characterized in that the first query result information comprises: a position of a floor where an elevator car is currently located, an elevator running speed and/or information about a degree of congestion of the car.

14. The elevator interactive system according to claim 11, characterized in that the elevator calling instruction comprises an initial floor and a destination floor, and the corresponding elevator dispatching result information comprises a serial number of an elevator assigned, a position of a floor where the elevator assigned is currently located and a running direction.

15. The elevator interactive system according to claim 1, characterized in that the first registered user is further classified into a VIP user, a disabled user and a normal user based on a user identity, wherein the VIP user and the disabled user have a higher priority, with respect to the normal user, to perform interactive communication with the second registered user.

16. The elevator interactive system according to claim 1, characterized in that the second registered user publishes information via the social communication media module, and the first registered user of the elevator interactive terminal acquires the published information via the social communication media module.

* * * * *